United States Patent [19]
Martinozzi

[11] 3,864,982
[45] Feb. 11, 1975

[54] KINEMATIC MECHANISM FOR THE REVERSIBLE CONVERSION OF RECIPROCATING MOTION TO ROTARY MOTION

[75] Inventor: Giulio Martinozzi, Rome, Italy
[73] Assignee: Kinespherics, Inc., New York, N.Y.
[22] Filed: June 12, 1973
[21] Appl. No.: 369,053

[52] U.S. Cl. ................................................ 74/60
[51] Int. Cl. .......................................... F16h 33/00
[58] Field of Search ............ 74/60, 800; 123/58 BC

[56] References Cited
UNITED STATES PATENTS

| | | | |
|---|---|---|---|
| 790,374 | 5/1905 | Maxwell | 74/60 |
| 1,520,960 | 12/1924 | Nagelmann | 74/60 |
| 3,540,307 | 11/1970 | Schell | 74/60 |
| 3,640,154 | 2/1972 | Massie | 74/800 |

FOREIGN PATENTS OR APPLICATIONS

| | | | |
|---|---|---|---|
| 121,138 | 7/1945 | Sweden | 74/60 |

*Primary Examiner*—Wesley S. Ratliff, Jr.
*Attorney, Agent, or Firm*—Robert W. Hagopian, Esq.

[57] ABSTRACT

A kinematic mechanism for the reversible conversion of rotative motion into reciprocating motion. A shaft containing an offset section is mounted by bearing means on a base frame such that the shaft is free to rotate about its cylindrical axis. A first conical gear with peripheral teeth is mounted on the offset section by bearing means such that it is free to rotate about its axis which intersects the axis at an angle $\alpha$. The gear has a vertex angle of $180 - \alpha$ degrees and is positioned on the offset section such that its virtual vertex coincides with the point 0 of the intersection of the gear and shaft axes. A first conical ring gear having the same base diameter, vertex angle, and pitch as the first conical gear is fixed to the frame such that its axis coincides with the shaft axis and such that its virtual vertex coincides with the point 0. The teeth of the fixed ring gear mesh with the teeth of the first conical gear whereby the movement of the first conical gear is constrained to one degree of freedom. A second conical ring gear is attached symetrically to the first conical gear and its virtual vertex coincides with the point 0. A second conical gear with peripheral teeth with the same pitch as the second ring gear is mounted on the shaft such that its virtual vertex coincides with the point 0 and its teeth mesh with the teeth of the second ring gear. If the first conical gear is driven by reciprocating means, the power will be translated with a high degree of efficiency from the first conical gear to the second conical gear via the second ring gear whereby no torque is exerted on the shaft.

3 Claims, 1 Drawing Figure

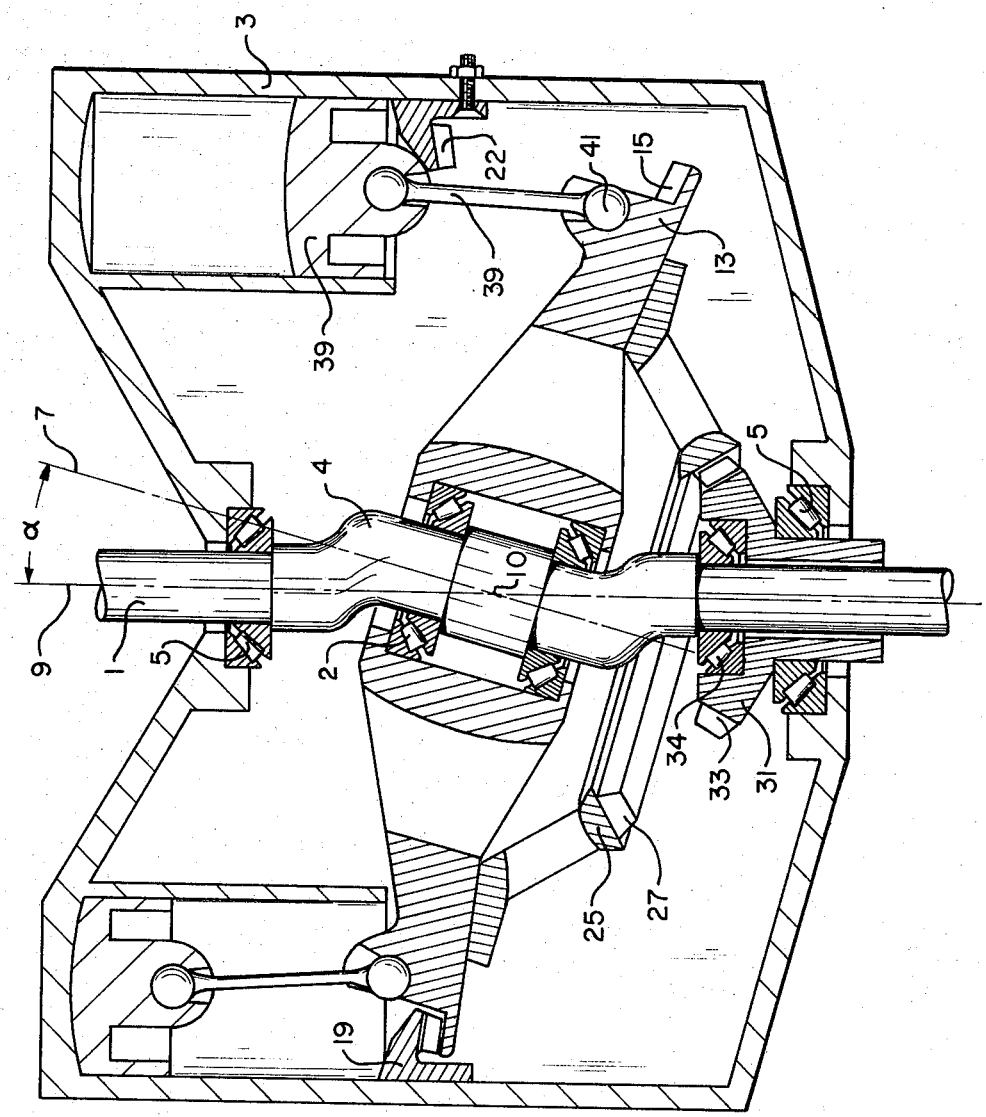

KINEMATIC MECHANISM FOR THE REVERSIBLE CONVERSION OF RECIPROCATING MOTION TO ROTARY MOTION

FIELD OF INVENTION

This invention relates generally to kinematic mechanisms transmitting power by means of gearing and more specifically to mechanisms which convert reciprocatory motion into rotary motion.

PRIOR ART

Swash Disk and wabbler type mechanism for converting reciprocatory motion into rotary motion are commonly utilized in motors and pumps. See for example *Swash Disk Motion-Transmitting Mechanism For Internal Combustion Engines, Compressors, or the Like*, Daubey, No. 2,737,055; *Mechanism For Converting Reciprocating Rotary Motion and Vice Versa*, Girodin, No. 2,702,483; and *Wobbler Mechanism*, Girodin, No. 3,180,159. In general, these mechanisms consists of varying combinations of crankpin, two matching conical gears, spherical bearings, and reciprocating means. One of the conical gears is mounted on the offset section of the crankpin. The other gear is fixed such that it constrains the first gear to one degree of freedom. The reciprocating means are attached to the first gear which in turn drives the crankpin. Difficulties have been experienced with the crankpin bearings as a result of the torque being applied to the crankpin, and applicant's invention is directed in part to overcoming this difficulty.

SUMMARY OF INVENTION

An object of the invention is to provide a kinematic mechanism to transform reciprocatory motion into rotary motion and vice versa, with a high degree of efficiency.

Another object of the invention is to provide a means of coupling out power with a high degree of efficiency from swash disk and wabbler type mechanisms without placing a torque on the crankpin. Another object of the invention is to provide an efficient speed reduction means which may be coupled to swash disk and wabbler type mechanisms.

A further object of the invention is to provide a kinematic mechanism to transmit rotative power with speed reduction. The kinematic mechanism is comprised of a base frame upon which a shaft is mounted by bearing means such that it is free to rotate about its cylindrical axis. The shaft has an offset section on which is mounted, by bearing means, a first conical gear with peripheral teeth such that the gear is free to rotate about its own axis. The shaft axis and gear axis intersect at an angle $\alpha$ and the gear is positioned on the offset section such that its virtual vertex coincides with the point of intersection of the two axes. The vertex angle of the gear is 180 -$\alpha$degrees.

A first conical ring gear having substantially the same base diameter and vertex angle as the first conical gear is attached to the frame such that its axis coincides with the shaft axis. The first ring gear opposes the first conical gear and is positioned such that its virtual vertex coincides with virtual vertex of the first conical gear. Its teeth have the same pitch as the teeth of the first conical gear whereby the two gears mesh. As the shaft is rotated the stationary ring gear constrains the first conical gear to one degree of freedom.

A second conical ring gear is attached symetrically to the first conical gear such that its virtual vertex will coincide with the virtual vertex of the first conical gear. A second conical gear with the same direction and pitch but different base diameter of the second ring gear is mounted on the shaft by bearing means such that its virtual vertex coincides with the virtual vertex of the second ring gear. The second ring gear meshes with the second conical gear and as the shaft is rotated, the cyclic motion of the second ring gear will rotate the second conical gear.

If the first conical gear is driven by reciprocating means, power will be transmitted with a high degree of efficiency via the second ring gear to the second conical gear from which it may be coupled out without any resultant torque being placed on the shaft.

These and other objects of the invention will become more apparent with the following specification and accompanying drawing illustrating a cross section of the basic kinematic mechanism with power takeoff assembly.

PREFERRED EMBODIMENT

The basic kinematic mechanism is illustrated. A shaft 1 is mounted on base frame 3 by roller bearings 5 such that it is free to rotate about its cylindrical axis 9 with respect to the frame. Although roller bearings 5 are illustrated as the bearing means to support shaft 1, any bearing means that will allow the shaft 1 to rotate freely with respect to the frame 3 may be utilized.

The shaft 1 has an offset section 4 upon which a first conical gear 13, having peripheral teeth 15, is mounted by roller bearings 2 such that it is free to rotate about its own axis 7. As illustrated, the offset section 4 is between two sets of bearings 5 and is anti-symetrical with respect to the shaft axis 9, but neither of these two factors is essential to the mechanism. The supporting bearing 5 may be located in any position with reference to the shaft 1. The offset section 4 does not have to be antisymetrical with respect to the shaft axis 9 although it is desirable for reducing vibrations.

The gear axis 7 intersects the shaft axis 9 at point 10 to form an angle $\alpha$. The vertex angle of the first conical gear 13 is 180 -$\alpha$degrees. The gear 13 is positioned on the offset section such that its virtual vertex coincides with point 10, the intersection of the gear axis 7 and shaft axis 7.

A first conical ring gear 19 with a vertex angle of 180 -$\alpha$degrees is attached to frame 3 such that its axis coincides with the shaft axis 9 and its virtual vertex coincides with point 10. The first ring gear 19 opposes the first conical gear 13. The teeth 22 of the first ring gear 19 have the same pitch as the teeth 15 of the first conical gear 13. The base circumference of the first ring gear 19 is substantially equal to the base circumference of the first conical gear 13, such that the teeth of the two gears will mesh. As the shaft 1 is rotated, the first conical gear 13 is constrained to one degree of movement, by the first ring gear 19, that is, the position of the first conical gear 13 is solely a function of the angle through which shaft 1 is rotated. The point of contact between the first conical gear 13 and the first ring gear 19 is the instantaneous axis of rotation which passes through point 10. Each point on the first conical gear 13 traces a cyclic path on a sphere having a radius equal to the distance between the point and point 10 and has zero net rotation with respect to shaft axis 9. Accordingly, the net rotation of the first conical gear 13 about shaft axis 9 is zero.

A second conical ring gear 25 having teeth 27 and a vertex angle $\beta$ is attached to the first conical gear 13 with its axis coinciding with the axis 7 of gear 13. The virtual vertex of the second ring gear 25 coincides with point 10. A second conical gear 31 with peripheral teeth 33 of the same pitch as teeth 27 is mounted by bearing means 34 on shaft 1 such that its axis coincides with the cylindrical axis 9 of the shaft 1 and such that it is free to rotate about its own axis. Its virtual vertex also coincides with point 10 and its vertex angle is equal to $\beta-\alpha$. Both the second ring gear 25 and second conical gear 31 have teeth with the same pitch.

The base diameter, $D_c$, of the second conical gear 31 is substantially related to the base diameter, $D_r$, of the second ring gear 25 by the following formula:

$$D_c = D_r \sin(\beta-\alpha)/\sin(\beta)$$

This relationship insures the meshing of the second ring gear 25 with the second conical gear 31.

As the shaft 1 is rotated, the motion of the second ring gear 25 is cyclic since it is attached to the first conical gear 13. As such, the net rotation of the second ring gear 25 about the shaft axis 9 is zero, but its cyclic motion drives the second conical gear 31. The line of contact between the second ring gear 25 and the second conical gear 31 passes through point 10 and is the instantaneous axis of rotation. Because the base diameter $D_c$ of the second conical gear 31 is less than the base diameter $D_r$ of the second ring gear 25, the gear 31 has a net rotation around shaft axis 9.

The relationship between the imput angular velocity $W_i$ of shaft 1 and the output angular velocity $W_o$ of the second conical gear 31 is given by the following relationship:

$W_o = \sin\beta - \sin(\beta\alpha)/\sin(\beta-\alpha)$ The unit as a reducer is extremely efficient in transmitting power reversibly since there are no friction sliding surfaces.

A modification of the above arrangement would be the addition of a third conical ring gear similar to the second ring gear 25 and a third conical gear similar to the second conical gear 31 on the opposite side of the first conical gear 13. Similarly, while in the drawing and above description, the second ring gear 25 and second conical gear 31 are illustrated in connection with applicant's arrangement of base frame 3, shaft 1, first conical gear 13, and first ring gear 19, they may be used in conjunction with other swash disk and wobbler type mechanisms.

In the drawing, one or more pistons 38 are attached to the first conical gear 13 by connecting rods 39 and by sperical bearings 41. The use of the spherical bearings 41 accommodates the cyclic spherical movement of the connection point on the first conical gear 13 between the connecting rod 39 and the first conical gear 13. When the pistons 38 reciprocate, the first conical gear 13 will roll in a cyclic motion as described above and the second conical ring gear 25 will drive the second conical gear 31. Power will be transmitted to the second conical gear 31 from which it may be coupled out. With this arrangement, no torque is placed on shaft 1 and this is one of the chief advantages of applicant's invention.

The appended claims are intended to cover all embodiments of applicant's invention with all modifications and changes which occur to these skilled in the art as fall within the spirit of the invention.

What is claimed:

1. A kinematic mechanism for the reversible conversion of rotative motion into reciprocating motion comprising:
   a. a base frame,
   b. a shaft having an offset section,
   c. bearings means to permit the shaft to rotate freely about its cylindrical axis, said bearing means being attached to the frame,
   d. a first conical gear with bearing means for mounting said gear on the offset section of the shaft so that it may rotate freely about its axis, the gear being positioned on the offset section whereby its axis intersects the shaft axis at an angle $\alpha$, said gear being positioned with its vitual vertex coinciding with the intersection of said gear and shaft axes, said gear having peripheral teeth and a vertex angle equal to 180 -$\alpha$degrees,
   e. a first conical ring gear having a vertex angle equal to 180 -$\alpha$degrees, a base circumference equal substantially to the base diameter of the first conical gear, and teeth with the same pitch as the teeth of the first conical gear, said ring gear being attached to the frame with its axis coinciding with the shaft axis and its virtual vertex coinciding with the intersection of the shaft and first conical gear axes, said ring gear opposing said first conical gear whereby the teeth of the ring gear mesh with the teeth of the first conical gear to constrain it to one degree of freedom when the shaft is rotated,
   f. a second conical ring gear with peripheral teeth and a vertex angle $\beta$, said gear being attached to one side of the first conical gear with its axis and virtual vertex coinciding with the axis and virtual vertex of the first conical gear,
   g. a second conical gear with peripheral teeth of the same pitch as the teeth of the second ring gear and bearing means for mounting the gear on the shaft so that it may rotate freely around the shaft said second conical gear having a vertex angle equal to $\beta-\alpha$ degrees and base diameter substantially equal to the base diameter of the second ring gear X $\sin(-\beta-\alpha)/\sin\beta$ said second conical gear being positioned on the same side of the first conical gear as is the second ring gear and with its axis coinciding with the shaft axis, and its virtual vertex coinciding with the virtual vertex of the second ring gear, whereby the teeth of the second ring gear mesh with the teeth of the second conical gear and drive it as the shaft rotates.

2. A kinematic mechanism as recited in claim 1 further comprising reciprocating means for driving the first conical gear.

3. An improved mechanism for reversibly transforming reciprocating motion into rotary motion of the type wherein a shaft, a first conical or "wabbler" gear, a first conical ring gear, and a crankpin with an offset section having an angle to its axis are arranged in combination by bearings such that the first conical gear constrains the "wabbler" gear to one degree of freedom as the shaft is rotated, the "wabbler" gear being mounted on the offset section of the crankpin at an angle to the crankpin axis, wherein the improvement comprises:

a second conical ring gear with a vertex angle $\beta$ attached to the wabbler gear with its axis and virtual vertex coinciding with the axis and virtual vertex of the wabbler gear, b. a second conical gear with teeth of the same pitch as the teeth of said ring gear and bearing means for mounting the gear on the crankpin so that it may rotate freely around the crankpin, said second conical gear having a vertex angle equal to $\beta-\alpha$ degrees and have diameter substantially equal to the base diameter of the said ring gear $$X \sin(\beta-\alpha)/\sin\beta$$

said conical gear having its virtual vertex coinciding with the virtual vertex of ring gear, whereby the teeth of said ring gear mesh with the teeth of said second conical gear and drive it as the crankpin is rotated.

* * * * *